Patented July 29, 1952

2,605,229

UNITED STATES PATENT OFFICE 2,605,229

CALCIUM PHOSPHATE GELS

Joseph K. Marcus, New York, N. Y.

No Drawing. Application April 23, 1949,
Serial No. 89,373

8 Claims. (Cl. 252—317)

This invention relates to the preparation of hydrous calcium orthophosphate gels referred to hereinafter simply as calcium phosphate gels, and methods for stabilizing and peptizing the same. It also includes the products resulting therefrom.

Authorities on nutrition consider calcium the nutrient most lacking in the American diet. The only constant good source of calcium from foods is milk. Unfortunately, many individuals, for a variety of reasons, don't drink any milk, or don't consume enough of it to insure their minimum daily requirements of calcium. The calcium in milk is present in the form of insoluble phosphate which is held in effective colloidal suspension as a result of the dispersing action of various agents present therein.

Nutritional studies have shown that calcium and phosphorus in their salts such as dicalcium phosphate or tricalcium phosphate are as effectively utilized by the body as the calcium and phosphorus of milk. This gave rise to attempts to use the calcium phosphates in nutrition as a substitute for the calcium and phosphorus of milk. But the insolubility of these salts and their large particle size proved to be a great drawback to their acceptance, for when added to water or other liquid they settle out quickly and leave a gritty taste in the mouth.

In the past, colloidal solutions of calcium phosphate have been prepared with the aid of electrolytes, gelatin, or casein as the dispersing or protective agents, but these solutions are unsuitable for nutritional purposes because they are either very dilute or contain nutritionally undesirable substances.

I have discovered that it is possible to prepare hydrous calcium phosphate gels in a stable concentrated form free of nutritionally undesirable substances which will remain dispersed in water when mixed therewith, to yield a milky suspension simulating the dispersion of calcium phosphate in milk.

As is well known, hydrous calcium phosphate gels are produced in double decomposition reactions by precipitation from aqueous solutions containing the appropriate calcium and phosphate ions. These reactions are of the two types shown below, type 1 being illustrated by reaction 1 which produces no by-products but water, and type 2 being illustrated by reactions 2 to 6 which form by-product salts. (Reaction 2 is included under type 2 since an acid such as hydrochloric is necessary to keep the monocalcium phosphate in solution with production of a by-product salt. Acid is also used in reactions 3 and 4 for the same purpose.)

(1) $3Ca(OH)_2 + 2H_3PO_4 \rightarrow Ca_3(PO_4)_2 + 6H_2O$ (2) 

(3) 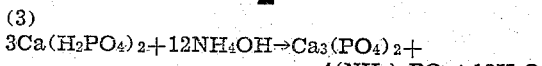

(4) 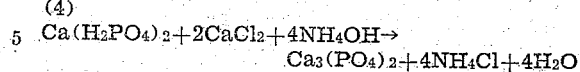

(5) 

(6) 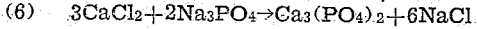

The calcium phosphate products in the above equations may be different from those shown depending upon the reaction conditions. In all cases they are probably either dicalcium phosphate, tricalcium phosphate, hydroxy apatite, $Ca_2(PO_4)_2 \cdot Ca(OH)_2$, or mixtures of two or more of these, except that in reaction 5, under some conditions, monocalcium phosphate may be formed as explained in Example 6. However, under all conditions, the by-products are those shown.

The great advantage of type 1 reactions in forming water as the only by-product is but a theoretical one, since the slight solubility of calcium hydroxide requires the use of a large volume of calcium hydroxide solution, giving a calcium phosphate gel which is very dilute and requires filtration for its concentration. In order to avoid the time consuming filtration of the gelatinous calcium phosphate precipitate, some have taken advantage of the increased solubility of calcium hydroxide in glycerine to carry out reactions of type 1 with concentrated solutions. This avoids the necessity for filtration, but the resulting calcium phosphate gel suffers from the serious disadvantage of contamination with the large amounts of glycerine which must be used.

It is possible to produce concentrated gels directly by the reactions of type 2, since the reagents are very soluble in water, but these gels contain a large amount of by-product salts the major portion and, preferably, substantially all of which must be separated before the gels can be used in nutrition. The only practical way of doing this is by washing with water. Dialysis could be used but would be very impractical.

Calcium phosphate gels in the concentrated form, including not only those formed by the reactions illustrated above but also those produced by other reactions, are unstable in that they separate water on standing. In addition, many gels which contain dicalcium phosphate give rise in time to crystals of dicalcium phosphate probably due to the influence of acid produced by hydrolysis. This, of course, ruins the product for its intended use in nutrition, for when it is mixed with water the crystals quickly settle to the bottom.

I have found that the tendency of calcium phosphate gels to separate water and crystallize can be prevented by incorporating therewith a compound capable of removing hydrogen ions produced by hydrolysis of the gel. Compounds having this property include, for instance, bases such as calcium hydroxide and magnesium hydroxide, and salts such as calcium carbonate, sodium bicarbonate and sodium citrate. The amount of hydrogen ions produced by hydrolysis depends upon the constitution of the calcium phosphate gel but is small in any case and, therefore, small amounts of the compounds mentioned suffice to stabilize the gel. Calcium phosphate gels produced under certain conditions already contain some crystals, which are probably dicalcium phosphate, and the addition of the above-mentioned compounds to such gels will prevent further crystallization.

The water-soluble citrates are unique in that they peptize calcium phosphate gels. I can use any of the primary, secondary and tertiary water-soluble citrates including those of ammonium and the alkali metals, for instance, sodium, potassium, and lithium. The secondary and tertiary citrates have a stronger peptizing action than the primary citrates. The addition of a small amount of the former immediately converts a firm calcium phosphate gel to a mobile liquid which sets to a thixotropic gel. The primary citrates, on the other hand, do not liquefy the gels even when added in large amounts. If only a limited peptizing action is desired, a small amount of soluble citrate may be used together with enough of the other non-peptizing agents mentioned to stabilize the gel.

The treatment of the calcium phosphate gels with the citrate results in the following changes:

(1) The peptized gel is more readily dispersed in water.

(2) The peptized gel when dispersed in water settles out much more slowly.

(3) There is an improvement in the taste of the water dispersion of the peptized gel.

Before treatment with the citrate, the calcium phosphate gel is a firm gelatinous mass, even though it contains over 90 per cent water. Apparently the colloidal particles of the calcium phosphate in the gel bind water, and powerful attractive forces hold these hydrated nuclei firmly to one another to form a solid network. The effect of the added citrate seems to be twofold. First it destroys, or weakens the forces cementing the hydrated nuclei, and second, it reduces the particle size of the calcium phosphate nuclei. It is likely that the first effect accounts for change number 1 listed in the preceding paragraph while the second effect explains changes 2 and 3.

When insoluble, powdered material such as calcium carbonate and tricalcium phosphate are mixed into the gels of the invention, they are held in effective suspension when the mixture is dispersed in water.

The invention is illustrated by the following examples in which the reagents used in preparing the gels analyzed as follows:

Calcium chloride—80.6% anhydrous calcium chloride
Disodium phosphate—97% anhydrous disodium phosphate
Trisodium phosphate—99.5% trisodium phosphate dodecahydrate

*Example 1*

A solution of 41 grams of calcium chloride in 830 c. c. of water was run into a flask kept in circular motion containing a solution of 16.2 grams of disodium phosphate and 47.5 grams of trisodium phosphate in 830 c. c. of water. The flask was then stoppered and shaken. After standing 15 minutes the mixture was filtered by water pump suction on a 250 mm. diameter Büchner funnel and washed with three approximately equal portions of water totaling 2800 c. c. Care was taken not to drain off too much water between washings so as to prevent cracking of the filter cake. Filtration and washing took about 25 minutes. With the vacuum pump still running, the filter cake was pressed for about 10 minutes to drain off the excess water. The calcium phosphate gel thus obtained weighed 445 grams. It had a calcium to phosphorus ratio of 1.8. No crystals were visible. One gram of the gel in 5 c. c. of water had a pH of 7.3.

*Example 2*

200 grams of the gel obtained in Example 1 were mixed with 3.5 grams of finely divided precipitated calcium carbonate. After 18 days, the pH of this treated gel was unchanged at 7.3, while the pH of the untreated gel of Example 1 had fallen to 5.6. No crystals were present in either case. Water had separated from the untreated gel but not from the treated gel. However, after 42 days, crystals appeared in the original gel but not in the treated gel. After one year, the treated gel was entirely free of crystals and separated water, and its pH was still 7.3; but the untreated gel contained an abundance of large crystals, its pH was down to 5.3, and it contained considerable separated water.

The stabilizing effect of calcium carbonate was observed with the use of as little as 4.6 grams to as much as 37 grams with the calcium phosphate gel prepared as described in Example 1, from 124 grams of calcium chloride in aging tests of from 110 to 390 days duration. On the basis of the weight of the calcium phosphate gel, this range of added calcium carbonate amounts to 0.34 to 2.82 per cent of the gel.

*Example 3*

This example shows the fine state of subdivision of the calcium phosphate in the gel and also the enmeshing action which the gel seems to have on the calcium carbonate powder to prevent its settling out, as it otherwise very quickly does when mixed with water alone. 13.6 grams of the year-old gel containing calcium carbonate obtained in Example 2 were mixed with 61.4 c. c. of water. The milky mixture was put through a hand homogenizer and transferred to a cylinder 1 inch in diameter. After standing for two hours there was no settling out of the gel as evidenced by the absence of a clear water layer on top, and there was no settling out of the calcium carbonate powder. The same result is obtained when the gel is mixed with water by hand stirring instead of putting it through the homogenizer. As is well known, calcium phosphate or calcium carbonate when in powder form settle out very quickly from their water mixtures.

*Example 4*

This example shows the enmeshing and suspending effect of the calcium phosphate gel on powdered tricalcium phosphate. 2.5 grams of finely divided precipitated calcium carbonate and 9 grams of U. S. P. tricalcium phosphate powder were mixed with 200 grams of the gel prepared as described in Example 1. After 185 days no crystallization had taken place and the original pH of 7.5 had changed to 7.4. A two hour settling test carried out in a cylinder 1 inch in diameter on 14.1 grams of this aged gel mixture diluted with 60.9 c. c. of water, showed 3 mm. of clear water layer on top of a 141 mm. column of the gel dispersion. This result was virtually the same as that obtained from this gel mixture on the day it was prepared in a like test, when the clear water layer on top of the dispersion measured 3.5 mm. There was no deposit on the bottom of the cylinder in either test, showing that the calcium carbonate and calcium phosphate powders were held in suspension by the calcium phosphate gel.

Example 5

4.6 grams of U. S. P. sodium bicarbonate were mixed with 445 grams of the gel obtained in Example 1. The mixture had a pH of 8.0. After 46 days, the pH was 7.3, after 183 days it was 7.2, after one year it was still 7.2, and the gel contained no crystals or separated water.

Example 6

A solution of 41 grams of calcium chloride in 830 c. c. of water was added to a solution of 43.9 grams of disodium phosphate in 830 c. c. of water. After carefully shaking just enough to obtain complete mixing of the solutions, the mixture was allowed to stand for 15 minutes, and then filtered and washed with 2800 c. c. of water in the manner described in Example 1. The time for filtration and washing was about the same as in Example 1, viz. 23 minutes. The gel thus obtained weighed 263 grams. It had a calcium to phosphorus ratio of 1.71, and a pH of 6.9. Tiny shining crystals were visible throughout the gel.

More than this minimum amount of agitation of the reaction mixture of disodium phosphate and calcium chloride leads to the increased formation of crystalline dicalcium phosphate and the resulting product is a mixture of gel and a considerable amount of crystals. On the other hand, if the solutions are carefully mixed to avoid excessive crystal formation, 23.5 per cent of the calcium is lost in the filtrate due to the formation of what is probably monocalcium phosphate, according to the equation:

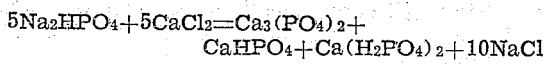

$$5Na_2HPO_4 + 5CaCl_2 = Ca_3(PO_4)_2 + CaHPO_4 + Ca(H_2PO_4)_2 + 10NaCl$$

The calcium to phosphorus ratio of the precipitated gel is 1.71, which is close to the calcium to phosphorus ratio of 1.72 for an equimolecular mixture of $Ca_3(PO_4)_2$ and $CaHPO_4$. The calcium to phosphorus ratio of the filtrate is 0.71, which is close to that of 0.64 for calcium monophosphate. The filtrate contains considerable acid material, as is shown by the large amount of sodium hydroxide solution required to neutralize it with phenolphthalein as indicator.

The older literature describes a gel, prepared from disodium phosphate and calcium chloride having a calcium to phosphorus ratio of 1.72. This calcium phosphate was assumed to be a compound which was given the name octacalcic triphosphate. However, the existence of such a compound is doubtful. Also, the literature contains conflicting claims regarding the nature of the acid material present in the filtrate, some claiming it is monocalcium phosphate, while others state that it is monosodium phosphate.

Continued agitation of the reaction mixture of disodium phosphate and calcium chloride leads to the disappearance of almost all of the acid calcium material from the filtrate and to the production of a precipitate whose calcium to phosphorus ratio is close to that of dicalcium phosphate. This is undoubtedly due to the interaction of the monocalcium phosphate and the tricalcium phosphate according to equation:

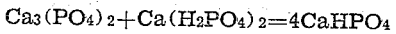

$$Ca_3(PO_4)_2 + Ca(H_2PO_4)_2 = 4CaHPO_4$$

Example 7

200 grams of the gel obtained in Example 6 were stabilized by the addition of 4.2 grams of calcium carbonate, whereupon the pH of the gel became 7.1. After 120 days, the pH was 7.0. No increase in the amount or size of the crystals had taken place, and no water had separated from the gel. On the other hand, the unstabilized gel, after 60 days, had declined in pH to 5.7, contained a large amount of enlarged crystals, and water had separated from it.

Example 8

A solution of 41 grams of calcium chloride in 830 c. c. of water was added to a solution of 75.5 grams of trisodium phosphate in 830 c.c. of water. The mixture was shaken and the precipitated gel was filtered and washed as described in Example 1. 2800 c. c. of water were used to wash the precipitate. The filtration was very slow, requiring 1½ hours. The calcium phosphate gel obtained weighed 370 grams. It had a calcium to phosphorus ratio of 1.97 and a pH of 10.8. It had a bitter taste, probably due to the presence of adsorbed sodium hydroxide, the origin of which will be explained below. This bitter taste of the gel would, of course, make it unsuitable for nutritional purposes. However, on standing, the pH of the gel diminished and the bitter taste disappeared. This was evidently due to the hydrolysis of the hydrous gel with the formation of acid. After one day, the pH of the gel was 8.1, after 6 days it was 7.4, after 15 days it was 7.1, after 131 days it was 6.1, and after 161 days it was unchanged at 6.1. No crystals appeared in the gel, but some water had separated therefrom within the first few days. In order to promptly convert the freshly prepared gel into a stable and edible form, its pH was adjusted to around the neutral point by the addition of an acid such as phosphoric, and then it was mixed with a stabilizing salt such as calcium carbonate or sodium bicarbonate.

The filtrate obtained in this example contained only a slight amount of calcium, and 2 per cent of the phosphorus present in the original reagents. It was highly alkaline with a pH of 11.5. A portion of the filtrate equivalent to 1.24 grams of calcium chloride used in the reaction required 12.7 c. c. of hydrochloric acid (0.096 N) for neutralization with phenolphthalein as indicator. When the hydrochloric acid titration of this same solution was continued with the addition of a drop of methyl orange as indicator, only 2.5 c.c. more hydrochloric acid was necessary to turn the indicator from orange to pink. This indicates the presence in the filtrate of a mixture of sodium hydroxide and trisodium phosphate, a conclusion derived as follows: If the 12.2 c. c. of hydrochloric acid required for the neutralization with phenolphthalein were due to the presence of only trisodium phosphate, only disodium phosphate would have been formed, according to the equation:

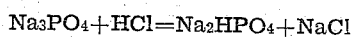

$$Na_3PO_4 + HCl = Na_2HPO_4 + NaCl$$

On continuing the titration of this disodium phosphate with methyl orange as indicator, approximately 12.2 c. c. more hydrochloric acid should have been required to neutralize, according to the equation:

$$Na_2HPO_4 + HCl = NaH_2PO_4 + NaCl$$

But instead, only 2.5 c. c. more hydrochloric acid was required.

The production of sodium hydroxide in the reaction between trisodium phosphate and calcium chloride may be explained by the equation:

$$Na_3PO_4 + CaCl_2 + H_2O = CaHPO_4 + NaOH + 2NaCl$$

This is in accord with the well-known fact that trisodium phosphate hydrolyzes in water to a great extent. After 8 days the filtrate from the gel of this example contained a small amount of precipitate composed of shining, thin crystals and an amorphous substance. The crystals are undoubtedly dicalcium phosphate, and the amorphous substance is either tricalcium phosphate or hydroxy apatite. The originally clear filtrate must have held these compounds in supersaturated solution and they must have been derived from the same compounds present in the gel. The presence of dicalcium phosphate together with sodium hydroxide in the filtrate indicates that trisodium phosphate and calcium chloride react, in part at least, according to the above equation.

From a consideration of the foregoing Examples 6 and 8, it will be seen that in Example 6 a soluble acid compound is formed which is responsible for the crystals in the gel, whereas in Example 8 a soluble alkaline compound is formed which is responsible for the bitter taste of the gel. I have found that by combining the reactions of Examples 6 and 8, as in Example 1 where a mixture of disodium phosphate and trisodium phosphate is used with the calcium chloride, a gel is produced which is free of both crystals and bitter taste and which may be readily filtered and washed. Apparently what happens is that there is a neutralization of the soluble monocalcium phosphate by the sodium hydroxide to form, probably, tricalcium phosphate.

The amounts of disodium phosphate and trisodium phosphate used in Example 1 may be stated as percentages of the total theoretical amounts required in Equations 5 and 6, respectively, for the amount of calcium chloride used. Equation 5 requires 43.5 grams of disodium phosphate for 41 grams of calcium chloride. Equation 6 requires 75.3 grams of trisodium phosphate for 41 grams of calcium chloride. I actually used 16.2 grams of disodium phosphate, which is 37 per cent of the amount required by Equation 5, and 47.5 grams of trisodium phosphate, which is 63 per cent of the amount required by Equation 6. Stated in this manner, the mixture of Example 11 is 50 per cent disodium phosphate and 50 per cent trisodium phosphate.

In Example 1, the mixture of 63 per cent trisodium phosphate and 37 per cent disodium phosphate produced an almost neutral filtrate. The filtrate is still a little on the acid side. For instance, the amount of filtrate produced from the reaction with 1.24 grams of calcium chloride required only 1.2 c. c. of sodium hydroxide (0.1 N) for neutralization with phenolphthalein. The filtrate contained only a slight amount of calcium and a considerable amount of disodium phosphate. On the other hand, when 1.24 grams of calcium chloride react with disodium phosphate as in Example 6 with a minimum amount of stirring, the filtrate requires 36 c. c. of sodium hydroxide (0.1 N) for neutralization with phenolphthalein. As mentioned before, this filtrate is rich in calcium.

Mixtures containing less than 63 per cent trisodium phosphate and more than 37 per cent disodium phosphate all gave gels which contained no crystals. But all these reactions produced filtrates which became richer in calcium as the per cent of trisodium phosphate decreased and the per cent of disodium phosphate increased. On standing, all these gels crystallized, declined in pH value, and separated water. They all could be stabilized, as in Example 1, by the addition of a stabilizing agent such as calcium carbonate.

When the proportion of trisodium phosphate used in the reaction with calcium chloride rises to about 70 per cent and the disodium phosphate falls correspondingly to 30 per cent, the filtrate becomes alkaline, the pH of the washed gel rises to 8.0, and the speed of filtration of the gel is greatly reduced to about that of the 100 per cent trisodium phosphate reaction of Example 8.

*Example 9*

A calcium phosphate gel was prepared from disodium phosphate and ammonia as follows: A solution of 41 grams of calcium chloride in 830 c. c. of water was added to a solution of 44 grams of disodium phosphate and 33 c. c. of ammonia water (sp. gr. 0.90) in 830 c. c. of water. The mixing and filtration procedure was the same as that used in Example 1. 2800 c. c. of water were used for washing. Filtration was very slow, requiring two hours. The gel so obtained weighed 367 grams. It was stabilized by the addition of calcium carbonate.

*Example 10*

A calcium phosphate gel was prepared from calcium monophosphate and ammonia as follows: To 76 grams of calcium monophosphate monohydrate in 1000 c. c. of water were added 22 c. c of hydrochloric acid (sp. gr. 1.19). The resulting cloudy solution was added to 250 c. c. ammonia water (sp. gr. 0.90) in 550 c. c. of water. The mixing and filtration procedure was the same as in Example 1. 2800 c. c. of water were used for washing. The filtration was very slow, requiring 2½ hours. The gel so obtained weighed 356 grams. It was stabilized by the addition of calcium carbonate.

*Example 11*

This example describes the isolation and identification of the crystals of dicalcium phosphate formed on aging a calcium phosphate gel. A 200-gram portion of the calcium phosphate gel prepared by the procedure of Example 1 from 41 grams of calcium chloride and a mixture of 22 grams of disodium phosphate and 37.7 grams of trisodium phosphate, and aged for 109 days, was mixed with 900 c. c. of water. After standing for 25 minutes, the suspension was decanted leaving the crystals on the bottom. The crystals were washed four times by decantation with 250 c. c. portions of water and then again in a Büchner funnel. The crystals were then air dried and analyzed for calcium and phosphorus. The analysis showed them to be dicalcium phosphate dihydrate. When viewed with a hand lens they were seen to be diamond-shaped plates with jagged edges and extremely sharp points. Some of them were 7 mm. long. 2.3 grams of the crystals were isolated. This represents an 8 per cent yield of dicalcium phosphate dihydrate based on the calcium chloride used.

Example 12

The calcium phosphate gels of this invention have the property of emulsifying oils with the production therewith of very stable emulsions. A lemon oil emulsion was prepared by mixing 12.3 grams of lemon oil with 100 grams of the calcium phosphate gel described in Example 2. The oil was readily taken up by the gel and a pale straw yellow soft paste was obtained. This emulsion was intact after 6 months, and no deterioration in the lemon oil had occured, as was evident from its unmodified rich fruity color. This emulsion could be easily dispersed in water to give a homogeneous dispersion of any desired dilution. Similar stable emulsions were obtained from this gel with orange oil, olive oil, lanolin and cod liver oil.

The following examples illustrate the stabilizing and peptizing actions of soluble citrates on calcium phosphate gels. In each example the sodium citrate used was trisodium citrate dihydrate.

Example 13

Seven grams of sodium citrate were added to 454 grams of calcium phosphate gel prepared as described in Example 1. This is at the rate of 0.58 gram of sodium citrate per gram of calcium. On mixing, the firm calcium phosphate gel became a thixotropic milky liquid. It was passed through a hand homogenizer, and the resulting liquid soon set to a firm white gel. It had a pH of 8.4. The pH of the original gel was 7.3, and that of a 1 per cent aqueous sodium citrate solution is 8.0. After 3 days, the pH of the gel with the sodium citrate was 7.9, after 5 days it was 7.5, and after 100 days it was 6.9. No crystals were present. The gel had its original white color. When the liquid form of the thixotropic gel was heated, it quickly solidified. This solid form would not change to a liquid condition on shaking unless it was cooled. When this peptized gel was dried at room temperature after standing for 8 days, it could not be dispersed in water, but gave a suspension that settled quickly. Another interesting property of this peptized gel is that it absorbs organic liquids like alcohol and acetone to form stable emulsions therewith.

If this thixotropic gel is allowed to air dry at room temperature, a hard shining white enamel-like mass resembling teeth and bone is obtained. This striking result is highly suggestive in possibly pointing to the role of the plasma citrates in bringing about the colloidal dispersion of the calcium phosphates, which may be a necessary prerequisite for the formation of the dense compacted calcium phosphate structure found in normal bone and teeth. The thixotropy exhibited by the gel may also be common to the calcium phosphate precipitate of the animal organism, where the immobilizing of the precipitated calcium phosphate gel may be a prelude to the formation of the hard bone therefrom.

Example 14

The initially high pH of 8.4 obtained when adding the sodium citrate to the calcium phosphate gel as described above may be reduced at once to around neutrality by adding some acid. Thus to 450 grams of calcium phosphate gel obtained as described in Example 1, I added 12 grams of sodium citrate (1 gram per gram of calcium) and 1 gram of anhydrous citric acid. The pH of the resulting thixotropic gel was 7.5. After 95 days it was 7.1 and no crystallization had taken place. The effect of the citric acid was probably to convert some of the trisodium citrate to disodium citrate.

Example 15

Other stabilizing salts may be used with the sodium citrate in case it is desired to use only a small amount of the latter. Thus, to 450 grams of calcium phosphate gel, prepared as described in Example 1, 4 grams of sodium citrate (0.33 per gram of calcium) and 1 gram of anhydrous citric acid were added, which resulted in a peptized white thixotropic gel with a pH of 7.0. Two grams of finely divided precipitated calcium carbonate were added, and after homogenizing, the resulting white thixotropic gel had a pH of 7.3. After 92 days the pH was 7.2 and no crystals were present. The calcium carbonate was held in suspension and did not settle out. Instead of calcium carbonate, other stabilizing agents such as sodium bicarbonate can be used together with the sodium citrate.

Example 16

100 grams of calcium phosphate gel prepared from trisodium phosphate according to Example 8, and containing 3.2 grams of calcium, were treated with 8 grams of sodium citrate (2.5 grams per gram of calcium) and homogenized. The original firm gel was thus transformed into a thixotropic white gel. After 8 days, some of this trixotropic gel which had become translucent and bluish was air dried at room temperature and gave a transparent residue which readily dispersed in water at room temperature to give a gel, unlike the dried gel of Example 13 which cannot be dispersed in water.

When the amount of sodium citrate was increased to 7 grams per gram of calcium, the gel was transferred in a few days to a clear mobile liquid with a bluish opalescence, viz. a colloidal solution.

Example 17

The unfavorable influence of salts such as sodium chloride on the action of sodium citrate on calcium phosphate gels is illustrated by the following experiment in which the sodium chloride by-product was not removed by filtration. A solution of 41 grams of calcium chloride in 110 c. c. of water was added to a solution of 75.4 grams of trisodium phosphate and 29.8 grams of sodium citrate in 30 c. c. of water After shaking the mixture, a white emulsion resulted which broke after two days, and a clear water layer appeared on top. This mixture contained about 5.9 per cent sodium chloride. On longer standing more water separated on top. 2.5 grams of sodium citrate per gram of calcium were used in this experiment.

When 7 grams of sodium citrate per gram of calcium were used, a thixotropic gel was obtained in about one hour and no water separated from it on standing. This stable gel gradually became translucent and bluish in color. Thus, the antagonistic action of sodium chloride may be overcome by the use of an excess of sodium citrate.

Example 18

100 grams of calcium phosphate gel prepared from disodium phosphate and ammonia, as described in Example 9, and containing 3.2 grams calcium were mixed with 3.2 grams of sodium citrate. A stable thixotropic gel was obtained.

Example 19

100 grams of calcium phosphate gel prepared from calcium monophosphate and ammonia, as described in Example 10, and containing 3.3 grams of calcium were mixed with 3.3 grams of sodium citrate. A stable thixotropic gel was obtained.

Example 20

The reduction in the particle size of calcium phosphate gels effected by the soluble citrates was demonstrated as follows: 250 cc. dispersions of the peptized and unpeptized gels described in Examples 2 and 14, each containing 1 gram of calcium, were prepared by homogenization in the case of the unpeptized gel, and by simple shaking in the case of the peptized gel, and these milky dispersions were allowed to stand in cylinders 1 inch in diameter. The first appearance of a clear water layer on top of the unpeptized gel dispersion took 2½ hours, as against 15 hours for the peptized gel. After 23 hours, the clear upper layer of the unpeptized dispersion was 20 mm. out of a total height of 100 mm. In 41 hours the clear upper layer of the peptized dispersion measured only 3 mm. out of a total height of 100 mm.

It is to be noted that sodium and potassium citrates which are effective in peptizing the calcium phosphate gels are also the citrates present in milk, where they undoubtedly perform the same function. The average amount of citrate present in a quart of milk is equivalent to 3 grams of tertiary sodium citrate dihydrate. Milk contains 1.2 grams of calcium per quart, and thus averages 2.5 grams of tertiary sodium citrate dihydrate per gram of calcium. In the examples given above, I have shown that calcium phosphate gels can be peptized with much less than this amount of citrate per gram of calcium. As a matter of fact, as little as 0.1 gram of sodium citrate per gram of calcium begins to peptize the gel, as is evident by the increase in its smoothness and looseness. However, this small amount of citrate does not liquefy the gel. The liquefaction and production of the thixotropic gel does not occur until about 0.5 gram of sodium citrate has been added per gram of calcium.

One of the purposes in filtering and washing the precipitated calcium phosphate gel is to remove the by-product salt formed in the reaction and thus make the gel acceptable for nutrition. In using the gel for nutrition it would be mixed with water, milk or other liquid in amounts designed to furnish the minimum daily requirements of calcium, or more. For instance, a glass of water containing 39 grams of the gel as made in Example 14 would furnish 1 gram of calcium, the minimum adult daily requirement. This amount of gel would contain 2.9 grams of by-product sodium chloride if it had not been removed by filtration. This amount of sodium chloride is objectionable from both taste and nutritional standpoints. It is about 6 times the amount of alkali metal chlorides present in 250 cc. of milk. In cases where complete elimination of the sodium chloride is not desired, is is obvious that the washing operation can be omitted, especially if very dilute solutions of the reagents are used.

While my gels are primarily intended for use in human nutrition, they may be employed for other purposes in which case the stabilizing or other compounds added need not be edible.

Since my gels are in paste form, they can be used as tooth pastes with or without addition of other materials such as the abrasive powders commonly employed in dentifrices. No emulsifying agent is required to hold such powders in suspension.

I claim:

1. Process of producing a hydrous calcium phosphate gel which comprises reacting an aqueous solution of a water soluble calcium salt with an aqueous solution of water soluble di-basic and tri-basic phosphates containing no anion capable of producing an insoluble calcium salt other than calcium phosphate the molar ratio of the tri-basic phosphate to the di-basic phosphate per mole of calcium salt less than 1.55, filtering and washing the precipitate and adding to the washed precipitate a compound capable of removing hydrogen ions in an amount sufficient to remove the hydrogen ions produced by hydrolysis of the gel.

2. Process of producing an aqueous thixotropic calcium phosphate gel which comprises reacting an aqueous solution of a water soluble calcium salt with an aqueous solution of water soluble di-basic and tri-basic phosphates containing no anion capable of producing an insoluble calcium salt other than calcium phosphate, the molar ratio of the tri-basic phosphate to the di-basic phosphate per mole of calcium salt being less than 1.55, filtering and washing the precipitate and adding to the washed precipitate a citrate salt of the group consisting of water soluble secondary and tertiary citrates in an amount sufficient to render the gel thixotropic.

3. Process of producing an aqueous thixotropic calcium phosphate gel which comprises reacting an aqueous solution of a water soluble calcium salt with an aqueous solution of water soluble di-basic and tri-basic phosphates containing no anion capable of producing an insoluble calcium salt other than calcium phosphate, in the proportion of about .37 mole of di-basic phosphate and about .42 mole of tri-basic phosphate for each mole of calcium salt, filtering and washing the precipitates and adding to the washed precipitate a citrate salt of the group consisting of water soluble secondary and tertiary citrates in an amount sufficient to render the gel thixotropic.

4. Process of producing an aqueous thixotropic calcium phosphate gel which comprises reacting an aqueous solution of a water-soluble calcium salt with an aqueous solution of di-basic and tri-basic alkali metal phosphates containing no anion capable of producing an insoluble calcium salt other than calcium phosphate, in the proportion of about .37 mole of di-basic phosphate and about .42 mole of tri-basic phosphate for each mole of calcium salt, filtering and washing the precipitate and adding tri-sodium citrate to the washed precipitate in an amount sufficient to render the gel thixotropic.

5. A product produced by the process defined in claim 1.

6. A product produced by the process defined in claim 2.

7. A product produced by the process defined in claim 3.

8. A product produced by the process defined in claim 4.

JOSEPH K. MARCUS.

REFERENCES CITED

The following references are of record in the file of this patent:

UNITED STATES PATENTS

| Number | Name | Date |
| --- | --- | --- |
| 2,487,600 | Schneiderwirth | Nov. 8, 1949 |